United States Patent
Yang et al.

(10) Patent No.: US 10,331,580 B2
(45) Date of Patent: Jun. 25, 2019

(54) PERIPHERAL INTERFACE MULTIPLEXING METHOD, USER EQUIPMENT, AND EXTERNAL DEVICE

(71) Applicant: Huawei Technologies Co., Ltd., Shenzhen (CN)

(72) Inventors: Jun Yang, Shanghai (CN); Yuhua Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/557,634

(22) PCT Filed: Mar. 12, 2015

(86) PCT No.: PCT/CN2015/074097
§ 371 (c)(1),
(2) Date: Sep. 12, 2017

(87) PCT Pub. No.: WO2016/141586
PCT Pub. Date: Sep. 15, 2016

(65) Prior Publication Data
US 2018/0060252 A1     Mar. 1, 2018

(51) Int. Cl.
*G06F 13/10*     (2006.01)
*G06F 13/40*     (2006.01)

(52) U.S. Cl.
CPC .......... *G06F 13/102* (2013.01); *G06F 13/409* (2013.01); *G06F 13/4068* (2013.01); *G06F 2213/0042* (2013.01)

(58) Field of Classification Search
CPC ... G06F 13/102; G06F 13/409; G06F 13/4068
See application file for complete search history.

(56) References Cited

U.S. PATENT DOCUMENTS 5,799,036 A * 8/1998 Staples ................. G06F 13/409
                                                        375/222
5,948,077 A   9/1999 Choi et al.
(Continued)

FOREIGN PATENT DOCUMENTS

CN    101452433 A    6/2009
CN    101462433 A    6/2009
(Continued)

OTHER PUBLICATIONS

Foreign Communication From a Counterpart Application, European Application No. 15884269.0, Extended European Search Report dated Feb. 9, 2018, 7 pages.
(Continued)

*Primary Examiner* — Nimesh G Patel
(74) *Attorney, Agent, or Firm* — Conley Rose, P.C.

(57) ABSTRACT

A peripheral interface multiplexing method. The method includes receiving, by using a first pin in a peripheral interface of user equipment, a coded signal sent by an external device, where the coded signal includes a first electrical characteristic value of the first pin; decoding the coded signal to obtain a decoded signal, where the decoded signal includes a control signal that corresponds to the first electrical characteristic value of the first pin, and the control signal is used to control the peripheral interface to transmit a target signal that a user requests to transmit; and controlling, according to the control signal, a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

15 Claims, 6 Drawing Sheets

(56) References Cited

U.S. PATENT DOCUMENTS

| | | | | |
|---|---|---|---|---|
| 5,958,056 | A * | 9/1999 | Lehmann | G06F 13/409 713/310 |
| 8,466,817 | B2 * | 6/2013 | Chang | H03M 1/186 341/118 |
| 9,628,906 | B2 * | 4/2017 | Chowdary | H02J 7/0055 |
| 2009/0158627 | A1 | 6/2009 | Lee | |
| 2009/0198841 | A1 | 8/2009 | Yoshida et al. | |
| 2010/0161860 | A1 | 6/2010 | Chien et al. | |

FOREIGN PATENT DOCUMENTS

| | | |
|---|---|---|
| CN | 101510996 A | 8/2009 |
| CN | 102231143 A | 11/2011 |
| CN | 102572352 A | 7/2012 |
| CN | 203691642 U | 7/2014 |
| EP | 2650752 A2 | 10/2013 |
| EP | 2660808 A2 | 11/2013 |

OTHER PUBLICATIONS

Machine Translation and Abstract of Chinese Publication No. CN101452433, Jun. 10, 2009, 13 pages.
Machine Translation and Abstract of Chinese Publication No. CN102572352, Jul. 11, 2012, 39 pages.
Machine Translation and Abstract of Chinese Publication No. CN203691642, Jul. 2, 2014, 7 pages.
Foreign Communication From a Counterpart Application, PCT Application No. PCT/CN2015/074097, English Translation of International Search Report dated Dec. 21, 2015, 2 pages.
Foreign Communication From a Counterpart Application, PCT Application No. PCT/CN2015/074097, English Translation of Written Opinion dated Dec. 21, 2015, 7 pages.
Machine Translation and Abstract of Chinese Publication No. CN101510996, Aug. 19, 2009, 9 pages.
Machine Translation and Abstract of Chinese Publication No. CN102231143, Nov. 2, 2011, 15 pages.
Foreign Communication From A Counterpart Application, Chinese Application No. 201580058815.8, Chinese Office Action dated Feb. 28, 2019, 5 pages.

* cited by examiner

PERIPHERAL INTERFACE MULTIPLEXING METHOD, USER EQUIPMENT, AND EXTERNAL DEVICE

CROSS-REFERENCE TO RELATED APPLICATIONS

This application is a National Stage of International Application No. PCT/CN2015/074097, filed on Mar. 12, 2015, which is hereby incorporated by reference in its entirety.

TECHNICAL FIELD

The present disclosure relates to the field of communications technologies, and in particular, to a peripheral interface multiplexing method, user equipment (UE), and an external device.

BACKGROUND

As more functions can be implemented, UE is required to have increasingly high integration. As the product becomes lighter and thinner, the user equipment is required to provide more communications manners without affecting an overall appearance design of the user equipment. Therefore, a higher requirement is imposed on a quantity of peripheral interfaces of the user equipment. That is, the user equipment is required to have as few peripheral interfaces as possible.

However, a quantity of communications manners that can be provided by peripheral interfaces of existing user equipment is limited. If the user equipment is required to provide more communications manners, a quantity of peripheral interfaces of the user equipment may need to be increased. This affects an overall appearance design of the user equipment, and further affects user experience.

SUMMARY

Embodiments of the present disclosure provide a peripheral interface multiplexing method, user equipment, and an external device, so that signal transmission can be performed by multiplexing a peripheral interface of user equipment. Therefore, communications interfaces of user equipment can be extended without increasing a quantity of peripheral interfaces, so that the user equipment provides more communications manners, and user experience is improved.

According to a first aspect, an embodiment of the present disclosure provides a peripheral interface multiplexing method, where the method includes:

receiving, by using a first pin in a peripheral interface of user equipment, a coded signal sent by an external device, where the coded signal includes a first electrical characteristic value of the first pin; decoding the coded signal to obtain a decoded signal, where the decoded signal includes a control signal that corresponds to the first electrical characteristic value of the first pin, and the control signal that corresponds to the first electrical characteristic value is used to control the peripheral interface to transmit a target signal that a user requests to transmit; and controlling, according to the control signal that corresponds to the first electrical characteristic value, a pin that is in the peripheral interface and used for signal transmission to transmit the target signal.

With reference to the first aspect, in a first possible implementation manner of the first aspect, the decoding the coded signal to obtain a decoded signal includes determining, according to a correspondence between a control signal and an electrical characteristic value of the first pin, the control signal that corresponds to the first electrical characteristic value of the first pin.

With reference to the first aspect or the first possible implementation manner of the first aspect, in a second possible implementation manner of the first aspect, the first electrical characteristic value includes any one of electrical characteristic values such as a first voltage value, a first current value, a first impedance value, a first capacitance value, or a first resistance value to earth.

With reference to the first aspect or the first possible implementation manner of the first aspect, in a third possible implementation manner of the first aspect, the first pin in the peripheral interface is an ID pin, and the first electrical characteristic value of the first pin is a first resistance value to earth of the ID pin.

With reference to the third possible implementation manner of the first aspect, in a fourth possible implementation manner of the first aspect, the pin that is in the peripheral interface and used for signal transmission includes a D+/D− pin, a MicA_SSTX+/MicA_SSTX− pin, a MicA_SSRX+/MicA_SSRX− pin, and a GND_DRAIN pin.

According to a second aspect, an embodiment of the present disclosure provides a peripheral interface multiplexing method, where the method includes:

receiving a first instruction, where the first instruction carries a control signal corresponding to a type of a target signal that a user requests to transmit, and the first instruction is used to instruct a coding module to code the control signal; coding the control signal according to the first instruction to obtain a coded signal, where the coded signal includes a first electrical characteristic value that is of a first pin in a first peripheral interface and that corresponds to the control signal; and sending the coded signal to user equipment UE by using the first pin in the first peripheral interface of an external device, so that the UE obtains the control signal according to the coded signal, and controls a pin that is in a peripheral interface of the UE and used for signal transmission to transmit the target signal.

With reference to the second aspect, in a first possible implementation manner of the second aspect, the coding the control signal to obtain a coded signal includes determining, according to a correspondence between a control signal and an electrical characteristic value of the first pin, the first electrical characteristic value that is of the first pin and that corresponds to the control signal corresponding to the target signal.

With reference to the second aspect or the first possible implementation manner of the second aspect, in a second possible implementation manner of the second aspect, the first electrical characteristic value includes any one of electrical characteristic values such as a first voltage value, a first current value, a first impedance value, a first capacitance value, or a first resistance value to earth.

With reference to the second aspect or the first possible implementation manner of the second aspect, in a third possible implementation manner of the second aspect, the first pin in the first peripheral interface is an ID pin, and the first electrical characteristic value of the first pin is a first resistance value to earth of the ID pin.

With reference to any one of the foregoing possible implementation manners, in a fourth possible implementation manner of the second aspect, the method further includes switching, according to the control signal, a pin that is in the first peripheral interface of the external device and used for signal transmission, so as to receive the target signal transmitted by using the peripheral interface of the UE is received.

With reference to the fourth possible implementation manner of the second aspect, in a fifth possible implementation manner of the second aspect, the method further includes controlling a second interface of the external device to transmit the target signal, so that another external device in addition to the external device obtains the target signal, and the second interface is an interface other than the first peripheral interface.

According to a third aspect, an embodiment of the present disclosure provides user equipment, and the user equipment includes a receiving module, a decoding module, and a control module, where the receiving module is configured to receive, by using a first pin in a peripheral interface of the user equipment, a coded signal sent by an external device, where the coded signal includes a first electrical characteristic value of the first pin; the decoding module is configured to decode the coded signal received by the receiving module, to obtain a decoded signal, where the decoded signal includes a control signal that corresponds to the first electrical characteristic value of the first pin, and the control signal is used to control the peripheral interface to transmit a target signal that a user requests to transmit; and the control module is configured to control, according to the control signal obtained by the decoding module, a pin that is in the peripheral interface and used for signal transmission to transmit the target signal.

With reference to the third aspect, in a first possible implementation manner of the third aspect, the decoding module is configured to determine, according to a correspondence between a control signal and an electrical characteristic value of the first pin, the control signal that corresponds to the first electrical characteristic value of the first pin.

With reference to the third aspect or the first possible implementation manner of the third aspect, in a second possible implementation manner of the third aspect, the first electrical characteristic value includes any one of electrical characteristic values such as a first voltage value, a first current value, a first impedance value, a first capacitance value, or a first resistance value to earth.

With reference to the third aspect or the first possible implementation manner of the third aspect, in a third possible implementation manner of the third aspect, the first pin in the peripheral interface is an ID pin, and the first electrical characteristic value of the first pin is a first resistance value to earth of the ID pin.

With reference to the third possible implementation manner of the third aspect, in a fourth possible implementation manner of the third aspect, the pin that is in the peripheral interface and used for signal transmission includes a D+/D− pin, a MicA_SSTX+/MicA_SSTX− pin, a MicA_SSRX+/MicA_SSRX− pin, and a GND_DRAIN pin.

According to a fourth aspect, an embodiment of the present disclosure provides an external device, and the external device includes a determining module, a first switching module, a coding module, and a sending module, where the determining module is configured to determine a first instruction, where the first instruction carries a first control signal corresponding to a type of a target signal that a user requests to transmit, and the first instruction is used to instruct to switch a current coding module to the coding module corresponding to the first control signal; the first switching module is configured to switch, according to the first instruction determined by the determining module, the current coding module to the coding module corresponding to the first control signal; the coding module is configured to code the first control signal according to the first instruction determined by the determining module, to obtain a coded signal, where the coded signal includes a first electrical characteristic value that is of a first pin in a first peripheral interface and that corresponds to the first control signal; and the sending module is configured to send, by using the first pin in the first peripheral interface of the external device, the coded signal obtained by the coding module to user equipment UE, so that the UE obtains the first control signal according to the coded signal, and controls a pin that is in a peripheral interface of the UE and used for signal transmission to transmit the target signal.

With reference to the fourth aspect, in a first possible implementation manner of the fourth aspect, the coding module is configured to determine, according to a correspondence between a first control signal and an electrical characteristic value of the first pin, the first electrical characteristic value that is of the first pin and that corresponds to the first control signal.

With reference to the fourth aspect or the first possible implementation manner of the fourth aspect, in a second possible implementation manner of the fourth aspect, the first electrical characteristic value includes any one of electrical characteristic values such as a first voltage value, a first current value, a first impedance value, a first capacitance value, or a first resistance value to earth.

With reference to the fourth aspect or the first possible implementation manner of the fourth aspect, in a third possible implementation manner of the fourth aspect, the first pin in the first peripheral interface is an ID pin, and the first electrical characteristic value of the first pin is a first resistance value to earth of the ID pin.

With reference to any one of the foregoing possible implementation manners, in a fourth possible implementation manner of the fourth aspect, the external device further includes the switching module configured to switch, according to the first control signal, a pin that is in the first peripheral interface of the external device and used for signal transmission, so that the target signal transmitted by using the peripheral interface of the UE is received.

With reference to the fourth possible implementation manner of the fourth aspect, in a fifth possible implementation manner of the fourth aspect, the external device further includes a control module configured to control a second interface of the external device to transmit the target signal, so that another external device in addition to the external device obtains the target signal, and the second interface is an interface other than the first peripheral interface.

Based on the foregoing technical solutions, according to the peripheral interface multiplexing method, the user equipment, and the external device that are provided in the embodiments of the present disclosure, a coded signal sent by an external device is received by using a peripheral interface of user equipment, and the coded signal is decoded to obtain a first control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

BRIEF DESCRIPTION OF DRAWINGS

To describe the technical solutions in the embodiments of the present disclosure more clearly, the following briefly describes the accompanying drawings for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
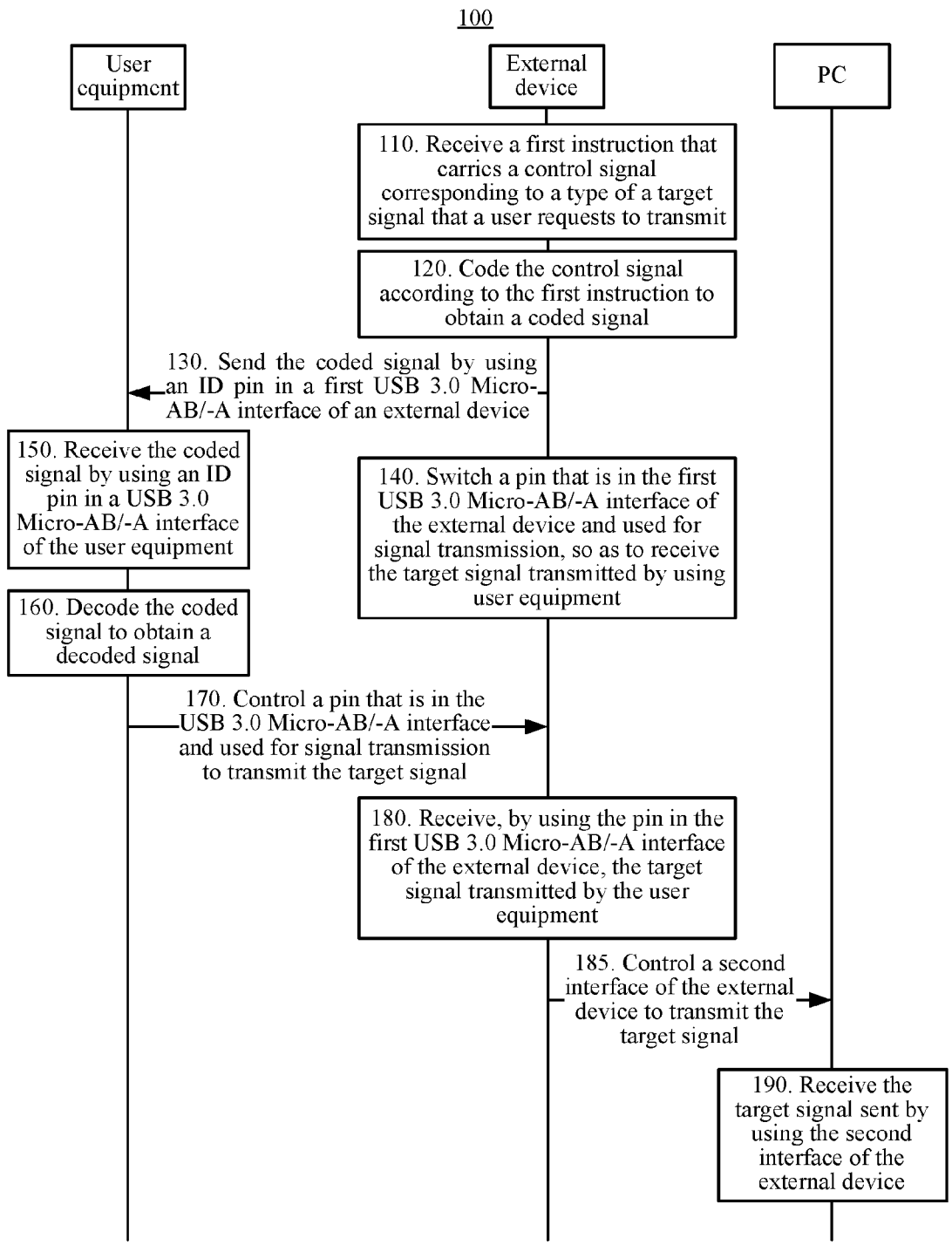
FIG. 1 is a schematic interaction diagram of a peripheral interface multiplexing method according to an embodiment of the present disclosure.

The following clearly and completely describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a Universal Serial Bus (USB) interface may be used as a peripheral interface of user equipment. A USB3.0 interface includes nine pins. As shown in Table 1, a pin 1 and a pin 4 are used as power cables; and a pin 2, a pin 3, a pin 5, a pin 6, a pin 7, a pin 8, and a pin 9 are used as signal cables.

TABLE 1

Definitions of pins of a USB 3.0 interface

| Pin number | Signal name | Function description | Arrangement sequence |
|---|---|---|---|
| 1 | VBUS | Positive electrode of a power supply | Second layer |
| 2 | D+ | Differential line pair compatible with a USB 2.0 interface | Third layer |
| 3 | D− | | |
| 4 | GND | Power ground | Second layer |
| 5 | StdA__SSTX− | High-speed transmitter differential line pair | Third layer |
| 6 | StdA__SSTX+ | | |
| 7 | GND_DRAIN | Ground for signal return | Second layer |
| 8 | StdA__SSRX− | High-speed receiver differential line pair | Third layer |
| 9 | StdA__SSRX+ | | |
| Shell | Sgield | Connection shell | First layer |

A quantity of pins of a USB 3.0 Micro interface has been 10. As shown in Table 2, a pin 1 and a pin 5 are used as power cables; a pin 2, a pin 3, a pin 6, a pin 7, a pin 8, a pin 9, and a pin 10 are used as signal cables; and a pin 4 is used as an ID line.

TABLE 2

Definitions of pins of a USB 3.0 Micro-AB/-A interface

| Pin number | Signal name | Function description | Arrangement sequence |
|---|---|---|---|
| 1 | VBUS | Positive electrode of a power supply | Second layer |
| 2 | D+ | Differential line pair compatible with a USB 2.0 interface | Third layer |
| 3 | D− | | |
| 4 | ID | OTG identification | |
| 5 | GND | Power ground | Second layer |
| 6 | StdA__SSTX− | High-speed transmitter differential line pair | Third layer |
| 7 | StdA__SSTX+ | | |
| 8 | GND_DRAIN | Ground for a high-speed signal | Second layer |
| 9 | StdA__SSRX− | High-speed receiver differential line pair | Third layer |
| 10 | StdA__SSRX+ | | |
| Shell | Sgield | Connection shell | First layer |

For ease of description, the following describes the technical solutions in the embodiments of the present disclosure in detail with reference to FIG. 1 by using an example in which a peripheral interface is a USB 3.0 Micro-AB/-A interface, a first pin in the peripheral interface is an ID pin, and a first electrical characteristic value of the first pin is a first resistance value to earth of the ID pin. It should be understood that, this is only an example for describing the technical solutions in the embodiments of the present disclosure, and does not constitute any limitation on the embodiments of the present disclosure.

FIG. 1 is a schematic interaction diagram of a peripheral interface multiplexing method 100 according to an embodiment of the present disclosure. The method 100 shown in FIG. 1 includes the following steps.

110. An external device determines a first instruction, where the first instruction carries a control signal corresponding to a type of a target signal that a user requests to transmit, and the first instruction is used to instruct a coding module to code the control signal.

120. The external device codes the control signal according to the first instruction to obtain a coded signal, where the coded signal includes a first resistance value to earth of an ID pin, and the first resistance value to earth corresponds to the control signal.

130. The external device sends the coded signal to user equipment UE by using the ID pin in a first USB 3.0 Micro-AB/-A interface of the external device.

140. The external device switches, according to the control signal, a pin that is in the first USB 3.0 Micro-AB/-A interface of the external device and used for signal transmission, so as to receive the target signal transmitted by using a USB 3.0 Micro-AB/-A interface of the UE.

150. The user equipment receives, by using an ID pin in the USB 3.0 Micro-AB/-A interface of the user equipment, the coded signal sent by the external device.

160. The user equipment decodes the received coded signal to obtain a decoded signal, where the decoded signal includes the control signal, and the control signal is used to control the USB 3.0 Micro-AB/-A interface of the user equipment to transmit the target signal that the user requests to transmit.

170. The user equipment controls, according to the control signal that corresponds to the first resistance value, a pin that is in the USB 3.0 Micro-AB/-A interface of the user equipment and used for signal transmission to transmit the target signal.

180. The external device receives, by using the pin that is in the first USB 3.0 Micro-AB/-A interface of the external device and used for signal transmission, the target signal that is transmitted by using the pin that is in the USB 3.0 Micro-AB/-A interface of the user equipment and used for signal transmission.

185. The external device controls a second interface of the external device to transmit the target signal, where the second interface is an interface other than the first USB 3.0 Micro-AB/-A interface.

190. A PC receives the target signal sent by using the second interface of the external device.

In this embodiment of the present disclosure, the type of the target signal that the user requests to transmit may include a USB signal, a Uart signal, an SPI signal, a Jtag signal, a USB OTG signal, or an MHL signal. Alternatively, the target signal that the user requests to transmit may also be a signal that is used to achieve a special function such as debugging or testing the user equipment. However, this is not limited in this embodiment of the present disclosure. That is, the control signal that is carried in the first instruction and corresponding to the type of the target signal that the user requests to transmit may be a control signal corresponding to any signal type of the foregoing types of the target signal that the user requests to transmit.

For example, in 110, the type of the target signal that the user requests to transmit may be a Uart signal, and a control signal that corresponds to the Uart signal and that is carried in the first instruction needs to be determined according to a preset correspondence between a type of a target signal that the user requests to transmit and a control signal. For example, it may be determined, by searching a correspondence table, such as a correspondence table shown in Table 3, storing a correspondence between a target signal that the user requests to transmit and a control signal, that the control signal that is carried in the first instruction and corresponding to the Uart signal is a control signal 3. The external device may receive the first instruction entered by the user, and the control signal 3 is coded according to an indication of the first instruction by a coding module corresponding to the control signal 3.

TABLE 3

Correspondence between a type of a target signal that a user requests to transmit and a control signal

| | Type of the target signal that the user requests to transmit | | | | | |
|---|---|---|---|---|---|---|
| | USB | USB OTG | MHL | Uart | Jtag | SPI |
| Control signal | 0 | 1 | 2 | 3 | 4 | 5 |

In 120, the external device may determine, according to a correspondence between a control signal and a resistance value to earth of the ID pin, a first resistance value to earth of the ID pin, where the first resistance value corresponds to the control signal 3. For example, it may be determined, by searching a correspondence table, such as a correspondence table shown in Table 4, storing the correspondence between a control signal and a resistance value to earth of the ID pin, that the first resistance value to earth of the ID pin corresponding to the control signal 3 is 2 kΩ. The coded signal includes that the first resistance value to earth of the ID pin corresponding to the control signal 3 is 2 kΩ. That is, the coded signal that is obtained by the coding module by coding the control signal corresponding to the Uart signal 3 is that the first resistance value to earth of the ID pin is 2 kΩ.

TABLE 4

Correspondence between a control signal and a resistance value to earth of the ID pin

| Control signal | 0 | 1 | 2 | 3 | 4 | 5 |
|---|---|---|---|---|---|---|
| Resistance value to earth of the ID pin | +∞ | 0 kΩ | 1 kΩ | 2 kΩ | 3 kΩ | 4 kΩ |

It should be understood that, in this embodiment of the present disclosure, the correspondence between a control signal and a resistance value to earth of the ID pin may be preset according to a need. However, a correspondence between a USB signal, a USB OTG signal, or an MHL signal and a resistance value to earth of the ID pin is stipulated in a protocol standard. Therefore, when a correspondence between a signal other than the three signals and a resistance value to earth of the ID pin is set, it should be ensured that the correspondence cannot be the same as the correspondence stipulated in the protocol standard, and it further should be ensured that a selected resistance value to earth of the ID pin can satisfy identification precision of the coding module and a decoding module. That is, if it is stipulated in the protocol standard that the resistance value to earth of the ID pin corresponding to the MHL signal is 1 kΩ, when a resistance value to earth of the ID pin corresponding to a Uart signal is set, the resistance value to earth of the ID pin corresponding to the Uart signal cannot be set to 1 kΩ, to avoid a conflict with the MHL signal, and cannot be set to 1.1 kΩ either, to prevent the coding module and the decoding module from failing to identify that a signal that corresponds to the resistance value to earth of the ID pin is a control signal of the Uart signal.

It should be further understood that, the correspondences shown in the foregoing Table 3 and Table 4 are only examples for describing the technical solution in this embodiment of the present disclosure, and do not constitute any limitation on this embodiment of the present disclosure. Moreover, this is not limited in this embodiment of the present disclosure.

In 130, the external device sends the coded signal to the user equipment UE by using the ID pin in the first USB 3.0 Micro-AB/-A interface of the external device, where the coded signal includes that the first resistance value to earth of the ID pin is 2 kΩ.

In 140, the external device switches, according to the control signal 3, the pin that is in the first USB 3.0 Micro-AB/-A interface of the external device and used for signal transmission, so as to receive the Uart signal transmitted by using the USB 3.0 Micro-AB/-A interface of the UE.

It should be noted that in this embodiment of the present disclosure, a correspondence between a pin that is in the first USB 3.0 Micro-AB/-A interface of the external device and used for signal transmission and a type of a target signal that a user requests to transmit needs to be preset. It needs to be noted that, it should be ensured that when preset, the correspondence does not conflict with a stipulation in an interface protocol of the first USB 3.0 Micro-AB/-A interface. When the user equipment transmits the Uart signal by using a pin that is used for signal transmission in a peripheral interface and that corresponds to the Uart signal, the external device needs to switch the pin that is in the first USB 3.0 Micro-AB/-A interface of the external device and used for signal transmission to a pin corresponding to the pin that is in the USB 3.0 Micro-AB/-A interface of the user equipment and used to transmit the Uart signal, so as to receive the Uart signal transmitted by using the USB 3.0 Micro-AB/-A interface of the user equipment.

For example, the preset correspondence between the pin that is in the first USB 3.0 Micro-AB/-A interface of the external device and used for signal transmission and the type of the target signal that the user requests to transmit indicates that the Uart signal corresponds to a GND_DRAIN pin and a MicA_SSTX+/MicA_SSTX− pin that are in the USB 3.0 Micro-AB/-A interface. That is, when the user equipment transmits the Uart signal by using the GND_DRAIN pin and the MicA_SSTX+/MicA_SSTX− pin that are in the USB 3.0 Micro-AB/-A interface, the external device needs to switch, according to the control signal, the pin that is in the first USB 3.0 Micro-AB/-A interface of the external device and used for signal transmission to the GND_DRAIN pin and the MicA_SSTX+/MicA_SSTX− pin, so as to receive the Uart signal transmitted by using the GND_DRAIN pin and the MicA_SSTX+/MicA_SSTX− pin that are in the USB 3.0 Micro-AB/-A interface of the user equipment.

In 150, the user equipment receives, by using the ID pin in the USB 3.0 Micro-AB/-A interface of the user equipment, the coded signal sent by the external device, where the coded signal includes that the first resistance value to earth of the ID pin is 2 kΩ.

In 160, the user equipment may determine, according to the correspondence between a control signal and a resistance value to earth of the ID pin, a control signal that corresponds to the first resistance value to earth, 2 kΩ, of the ID pin. The control signal is used to control the USB 3.0 Micro-AB/-A interface of the user equipment to transmit the Uart signal that the user requests to transmit. For example, it may be determined, by searching the correspondence table, such as the correspondence table shown in Table 4, storing the correspondence between a control signal and a resistance value to earth of the ID pin, that the control signal corresponding to the first resistance value to earth, 2 kΩ, of the ID pin is the control signal 3. Then, it may be determined, according to the correspondence shown in Table 3, that a type, corresponding to the control signal 3, of a target signal that the user requests to transmit is a Uart signal, and the control signal 3 is used to control the USB 3.0 Micro-AB/-A interface of the user equipment to transmit the Uart signal.

In 170, the user equipment controls, according to the control signal 3, the pin that is in the USB 3.0 Micro-AB/-A interface of the user equipment and used for signal transmission to transmit the Uart signal.

It should be noted that in this embodiment of the present disclosure, a correspondence between a pin that is in the USB 3.0 Micro-AB/-A interface of the user equipment and used for signal transmission and a type of a target signal that a user requests to transmit needs to be preset according to a user need. It needs to be noted that, it should be ensured that when preset, the correspondence does not conflict with a stipulation in an interface protocol of the USB 3.0 Micro-AB/-A interface.

For example, the preset correspondence between a pin that is in the USB 3.0 Micro-AB/-A interface of the user equipment and used for signal transmission and a type of a target signal that the user requests to transmit indicates that the Uart signal corresponds to a GND_DRAIN pin and a MicA_SSTX+/MicA_SSTX− pin that are in the USB 3.0 Micro-AB/-A interface. That is, the control signal 3 may control the GND_DRAIN pin and the MicA_SSTX+/MicA_SSTX− pin that are in the USB 3.0 Micro-AB/-A interface to transmit the Uart signal.

In 180, the external device receives, by using the GND_DRAIN pin and the MicA_SSTX+/MicA_SSTX− pin that are in the first USB 3.0 Micro-AB/-A interface of the external device, the Uart signal transmitted by using the GND_DRAIN pin and the MicA_SSTX+/MicA_SSTX− pin that are in the USB 3.0 Micro-AB/-A interface of the user equipment.

In 185, the external device controls the second interface of the external device to transmit the Uart signal, where the second interface is an interface other than the first USB 3.0 Micro-AB/-A interface, and the second interface is used to send the Uart signal.

In 190, the PC receives the Uart signal sent by using the second interface of the external device.

It should be understood that, in this embodiment of the present disclosure, the personal computer (PC) refers to an external device other than the external device. The PC herein is merely used as an example to describe the technical solution in this embodiment of the present disclosure in detail, and does not constitute any limitation on the scope of this embodiment of the present disclosure.

Therefore, according to the peripheral interface multiplexing method provided in this embodiment of the present disclosure, a coded signal sent by an external device is received by using a peripheral interface of user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be understood that sequence numbers of the foregoing processes do not mean execution sequences in the embodiments of the present disclosure. The execution sequences of the processes shall be determined according to functions and internal logic of the processes, but shall not be construed as any limitation on the implementation processes of the embodiments of the present disclosure.

Figure 2:
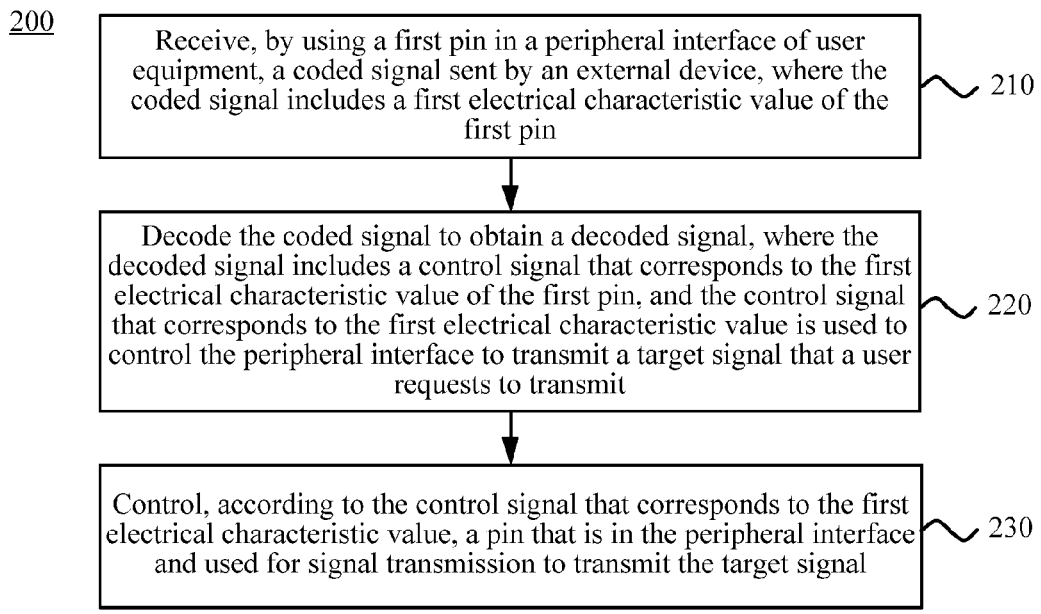
FIG. 2 is a schematic flowchart of a peripheral interface multiplexing method according to another embodiment of the present disclosure.

FIG. 2 is a schematic flowchart of a peripheral interface multiplexing method 200 according to an embodiment of the present disclosure. The method 200 shown in FIG. 2 may be performed by user equipment, and the method 200 includes the following steps.

210. The user equipment receives, by using a first pin in a peripheral interface of the user equipment, a coded signal sent by an external device, where the coded signal includes a first electrical characteristic value of the first pin.

220. The user equipment decodes the coded signal to obtain a decoded signal, where the decoded signal includes a control signal that corresponds to the first electrical characteristic value of the first pin, and the control signal is used to control the peripheral interface of the user equipment to transmit a target signal that a user requests to transmit.

230. The user equipment controls, according to the control signal that corresponds to the first electrical characteristic value, a pin that is in the peripheral interface and used for signal transmission to transmit the target signal.

In this embodiment of the present disclosure, the foregoing method may include when a signal is currently transmitted by using the peripheral interface of the user equipment, but the target signal that the user requests to transmit is inconsistent with the currently transmitted signal, the signal currently transmitted by using the peripheral interface of the user equipment needs to be switched to the target signal by using the control signal that corresponds to the first electrical characteristic value of the first pin, and the target signal is transmitted by using the pin that is in the peripheral interface and used for signal transmission.

It should be understood that, in this embodiment of the present disclosure, the first electrical characteristic value may include any one of electrical characteristic values such as a first voltage value, a first current value, a first impedance value, a first capacitance value, or a first resistance value to earth, or may include another electrical characteristic value. This is not limited in this embodiment of the present disclosure.

It should be further understood that, in this embodiment of the present disclosure, the peripheral interface of the user equipment may include a USB interface, a network cable interface, a bus interface, and the like.

Optionally, in an embodiment of the present disclosure, in 220, the decoding the coded signal to obtain a decoded signal includes determining, according to a correspondence between a control signal and an electrical characteristic value of the first pin, the control signal that corresponds to the first electrical characteristic value of the first pin.

Optionally, in another embodiment of the present disclosure, the first pin in the peripheral interface may be an ID pin, and the first electrical characteristic value of the first pin may be a first resistance value to earth of the ID pin.

It should be understood that, in this embodiment of the present disclosure, another pin in the peripheral interface may be selected as the first pin used to code and decode the control signal that corresponds to the type of the target signal requested by the user. This is not limited in this embodiment of the present disclosure.

Optionally, in another embodiment of the present disclosure, the pin that is in the peripheral interface and used for signal transmission includes a D+/D− pin, a MicA_SSTX+/MicA_SSTX− pin, a MicA_SSRX+/MicA_SSRX− pin, and a GND_DRAIN pin.

According to the peripheral interface multiplexing method provided in this embodiment of the present disclosure, a coded signal sent by an external device is received by using a peripheral interface of user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be noted that, steps 210, 220, and 230 included in the method 200 in this embodiment of the present disclosure may be used for implementing steps 150, 160, and 170 included in the method 100 shown in FIG. 1. For brevity of description, details are not described herein again.

Figure 3:
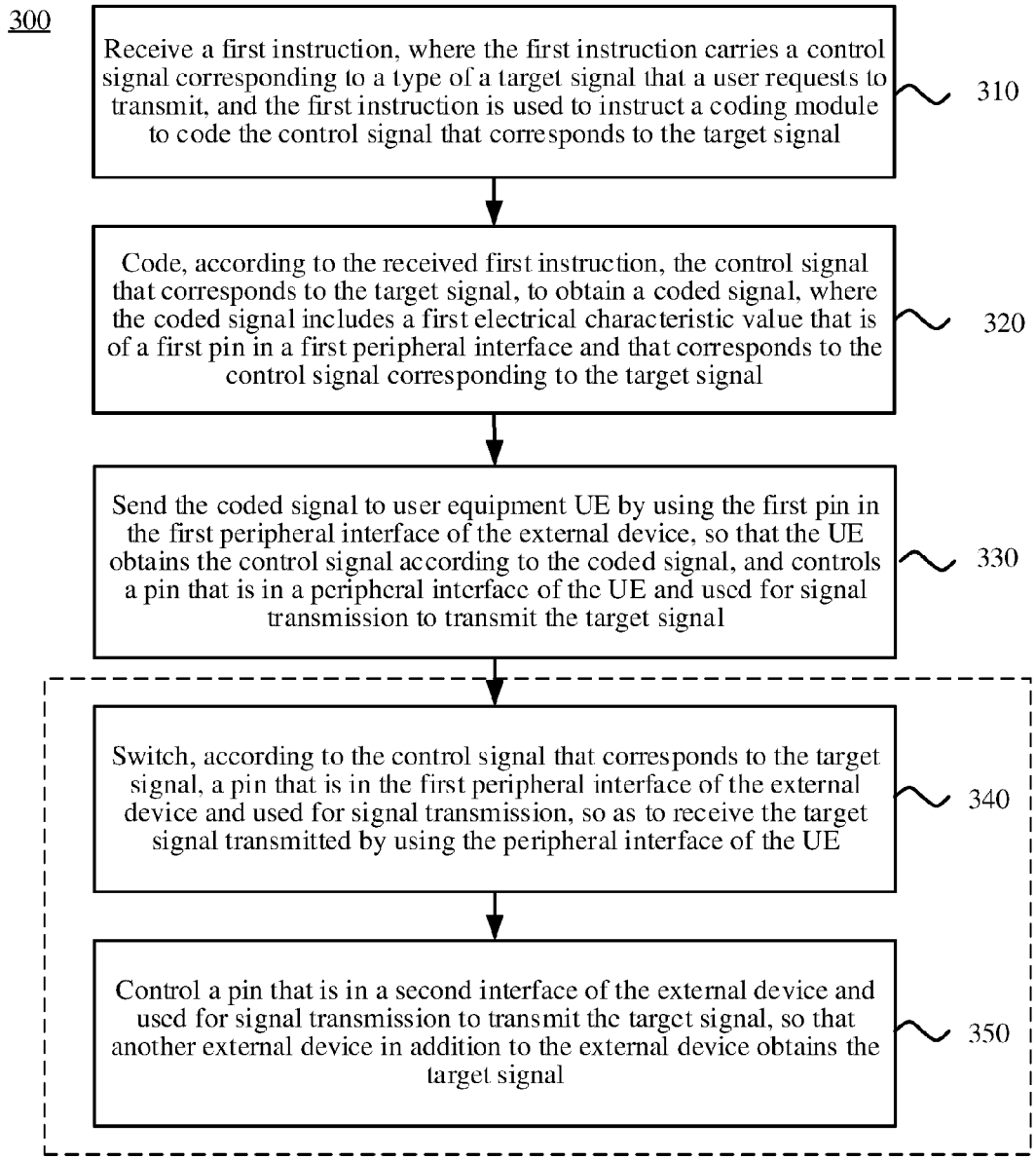
FIG. 3 is a schematic flowchart of a peripheral interface multiplexing method according to another embodiment of the present disclosure.

FIG. 3 is a schematic flowchart of a peripheral interface multiplexing method 300 according to another embodiment of the present disclosure. The method 300 shown in FIG. 3 may be performed by an external device, and the method 300 includes the following steps.

310. The external device determines a first instruction, where the first instruction carries a control signal corresponding to a type of a target signal that a user requests to transmit, and the first instruction is used to instruct a coding module to code the control signal.

320. The external device codes the control signal according to the first instruction to obtain a coded signal, where the coded signal includes a first electrical characteristic value that is of a first pin and that corresponds to the control signal.

330. The external device sends the coded signal to user equipment UE by using the first pin in a first peripheral interface of the external device, so that the UE obtains the control signal according to the coded signal, and controls a pin that is in a peripheral interface of the UE and used for signal transmission to transmit the target signal.

It should be understood that, in this embodiment of the present disclosure, a signal that needs to be transmitted by the user may include one type of signal or may include multiple types of signals. Each of the multiple types of signals may correspond to one control signal, and each control signal may correspond to one coding module, that is, one coding circuit. The external device may receive the first instruction entered by the user, and the control signal is coded according to an indication of the first instruction by a coding module corresponding to the control signal that is carried in the first instruction and corresponds to the type of the target signal. It should be further understood that, in this embodiment of the present disclosure, a correspondence between a type of a target signal that the user requests to transmit and a control signal needs to be preset.

It should be further understood that, in this embodiment of the present disclosure, the first electrical characteristic value may include any one of electrical characteristic values such as a first voltage value, a first current value, a first impedance value, a first capacitance value, or a first resistance value to earth, or may include another electrical characteristic value. This is not limited in this embodiment of the present disclosure.

Optionally, in an embodiment of the present disclosure, in 330, the coding the control signal to obtain a coded signal includes determining, according to a correspondence between a control signal and an electrical characteristic value of the first pin, the first electrical characteristic value that is of the first pin and that corresponds to the control signal corresponding to the target signal.

Optionally, in another embodiment of the present disclosure, the first pin in the first peripheral interface may be an ID pin, and the first electrical characteristic value of the first pin may be a first resistance value to earth of the ID pin.

It should be understood that, in this embodiment of the present disclosure, another pin in the first peripheral interface may be selected as the first pin used to code and decode the control signal that corresponds to the type of the target signal requested by the user. This is not limited in this embodiment of the present disclosure.

Optionally, in another embodiment of the present disclosure, the method 300 further includes 340. The external device switches, according to the control signal that corresponds to the target signal, a pin that is in the first peripheral interface of the external device and used for signal transmission, so as to receive the target signal transmitted by using the peripheral interface of the UE.

In this embodiment of the present disclosure, when the user equipment transmits, to the external device by using the pin that is in the peripheral interface of the user equipment and used for signal transmission, the target signal that the user requests to transmit, the external device needs to switch the pin that is in the first peripheral interface of the external device and used for signal transmission to a pin corresponding to the pin that is in the peripheral interface of the user equipment and used to transmit the target signal, so that the target signal transmitted by using the peripheral interface of the user equipment can be received.

Optionally, in another embodiment of the present disclosure, the method 300 further includes 350. The external device controls a second interface of the external device to transmit the target signal, so that another external device in addition to the external device obtains the target signal, and the second interface is an interface other than the first peripheral interface.

According to the peripheral interface multiplexing method provided in this embodiment of the present disclosure, a coded signal sent by an external device is received by using a peripheral interface of user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be noted that, steps 310, 320, 330, 340 and 350 included in the method 300 in this embodiment of the present disclosure may be used for implementing steps 110, 120, 130, 140, 180, 185, and 190 included in the method 100 shown in FIG. 1. For brevity of description, details are not described herein again.

The foregoing describes the peripheral interface multiplexing method according to the embodiments of the present disclosure in detail with reference to FIG. 1 to FIG. 3. The following describes user equipment and an external device according to embodiments of the present disclosure with reference to FIG. 4 to FIG. 7.

Figure 4:
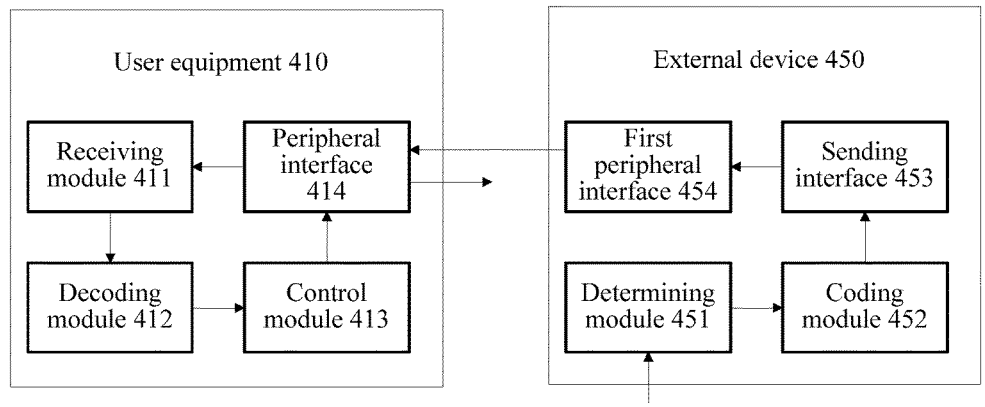
FIG. 4 is a schematic structural diagram of a system according to an embodiment of the present disclosure.

FIG. 4 is a schematic structural diagram of a system 400 according to an embodiment of the present disclosure. The system 400 shown in FIG. 4 includes user equipment 410 and an external device 450.

The user equipment 410 may include a receiving module 411, a decoding module 412, a control module 413, and a peripheral interface 414. The external device 450 may include a determining module 451, a coding module 452, a sending module 453, and a first peripheral interface 454.

In this embodiment of the present disclosure, the determining module 451 is configured to determine a first instruction, where the first instruction carries a control signal corresponding to a type of a target signal that a user requests to transmit, and the first instruction is used to instruct the coding module to code the control signal.

The coding module 452 is configured to code the control signal according to the first instruction determined by the determining module 451, to obtain a coded signal, where the coded signal includes a first electrical characteristic value that is of a first pin in a first peripheral interface and that corresponds to the control signal.

The sending module 453 is configured to send, by using the first pin in the first peripheral interface 454 of the external device 450, the coded signal obtained by the coding module 452 to the user equipment UE.

The receiving module 411 is configured to receive, by using a first pin in the peripheral interface 414 of the user equipment 410, the coded signal sent by the sending module 453 of the sending module 453 of the external device 450, where the coded signal includes the first electrical characteristic value of the first pin.

The decoding module 412 is configured to decode the coded signal received by the receiving module 411, to obtain a decoded signal, where the decoded signal includes the control signal that corresponds to the first electrical characteristic value of the first pin, and the control signal is used to control the peripheral interface to transmit the target signal that the user requests to transmit.

The control module 413 is configured to control, according to the control signal obtained by the decoding module 412, a pin that is in the peripheral interface 414 and used for signal transmission to transmit the target signal.

It should be understood that, in this embodiment of the present disclosure, the target signal that the user requests to transmit may not be sent from the user equipment to the external device. Alternatively, the target signal may be output by the user equipment in a light-up or screen-on manner. This is not limited in the present disclosure.

Figure 5:
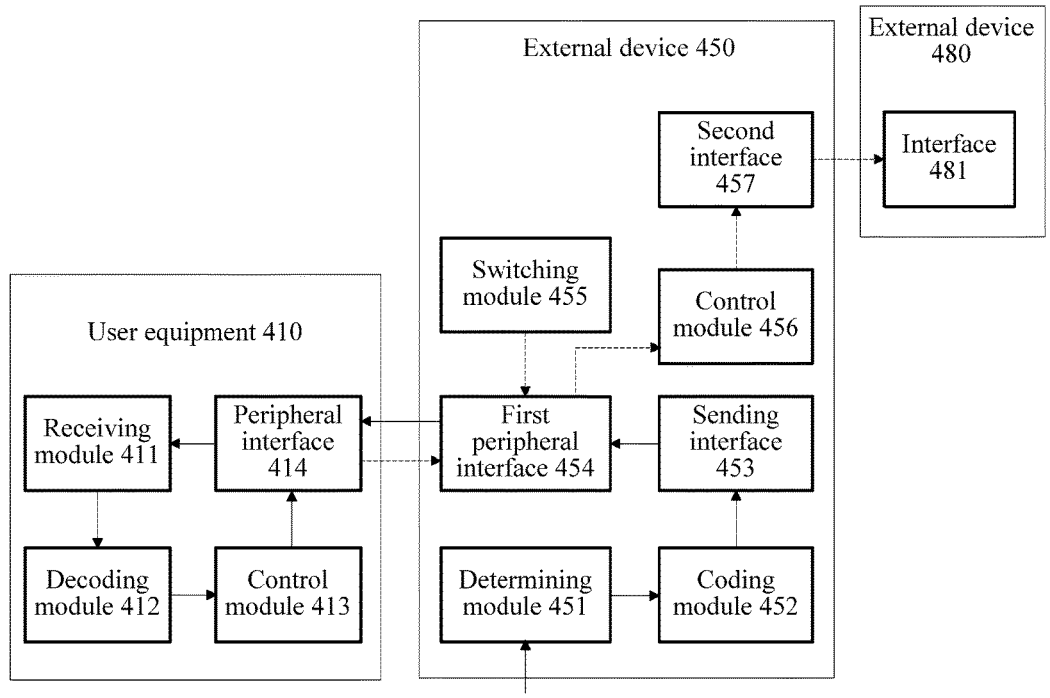
FIG. 5 is a schematic structural diagram of a system according to another embodiment of the present disclosure.

Optionally, in this embodiment of the present disclosure, as shown in FIG. 5, the system 400 may further include an external device 480 in addition to the external device 450. For example, the external device 480 may be a PC. However, this is not limited in the present disclosure. The external device 450 may further include a switching module 455, a control module 456, and a second interface 457, and the another external device 480 may include an interface 481.

In this embodiment of the present disclosure, the switching module 455 is configured to switch, according to the control signal, a pin that is in the first peripheral interface 454 of the external device 450 and used for signal transmission, so that the target signal transmitted by using the peripheral interface 414 of the user equipment 410 is received.

The control module 456 is configured to control the second interface 457 of the external device 450 to transmit the target signal.

The external device 480 is configured to receive, by using the interface 481, the target signal sent by the external device 450 by using the second interface 457.

It should be understood that, in this embodiment of the present disclosure, the second interface 457 included in the external device 450 may be an interface that is used to transmit the target signal and determined from multiple interfaces except the first peripheral interface, or may be an interface other than the first peripheral interface. Alternatively, the target signal may be transmitted by multiplexing the pin that is in the interface and used for signal transmission. This is not limited in the present disclosure. Similarly, the interface 481 included in the external device 480 may be an interface that is used to receive the target signal sent by using the second interface and that is determined from multiple interfaces. Alternatively, the target signal sent by using the second interface may be received by multiplexing the pin that is in the interface and used for signal transmission. This is not limited in the present disclosure.

According to the system in this embodiment of the present disclosure, a coded signal sent by the external device is received by using a peripheral interface of the user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be noted that, the user equipment 410 included in the system 400 in this embodiment of the present disclosure may be configured to perform steps 150, 160, and 170 included in the method 100 shown in FIG. 1, the external device 450 may be configured to perform steps 110, 120, 130, 140, 180, and 185 included in the method 100 shown in FIG. 1, and the external device 480 may be configured to perform step 190 included in the method 100 shown in FIG. 1. For brevity of description, details are not described herein again.

Figure 6:
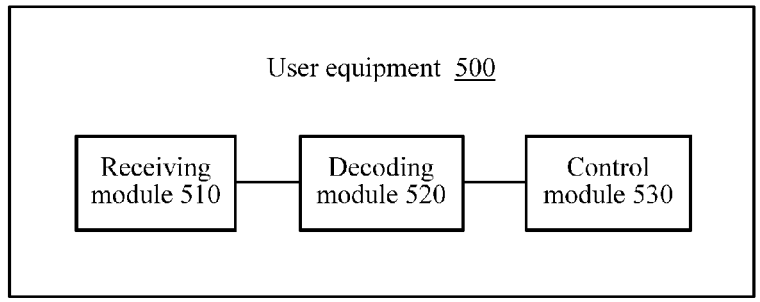
FIG. 6 is a schematic structural diagram of user equipment according to an embodiment of the present disclosure.

FIG. 6 is a schematic structural diagram of user equipment 500 according to an embodiment of the present disclosure. The user equipment 500 shown in FIG. 6 includes a receiving module 510, a decoding module 520, and a control module 530.

The receiving module 510 is configured to receive, by using a first pin in a peripheral interface of the user equipment 500, a coded signal sent by an external device, where the coded signal includes a first electrical characteristic value of the first pin.

The decoding module 520 is configured to decode the coded signal received by the receiving module 510, to obtain a decoded signal, where the decoded signal includes a first control signal that corresponds to the first electrical characteristic value of the first pin, and the first control signal is used to control to switch a signal currently transmitted by the peripheral interface, to a target signal that a user requests to transmit.

The control module 530 is configured to control, according to the control signal obtained by the decoding module 520, a pin that is in the peripheral interface and used for signal transmission to transmit the target signal.

In this embodiment of the present disclosure, the receiving module 510 may receive, by using the first pin in the peripheral interface of the user equipment 500, the coded signal sent by the external device by using a first pin in a first peripheral interface of the external device. The coded signal includes the first electrical characteristic value of the first pin. The decoding module 520 decodes the coded signal to obtain the decoded signal including the control signal that corresponds to the first electrical characteristic value of the first pin. The control signal is used to control the peripheral interface of the user equipment to transmit the target signal that the user requests to transmit. The control module 530 controls, according to the control signal, the pin that is in the peripheral interface and used for signal transmission to transmit the target signal. That is, when a signal is currently transmitted by using the peripheral interface of the user equipment, but the target signal that the user requests to transmit is inconsistent with the currently transmitted signal, the signal currently transmitted by using the peripheral interface of the user equipment needs to be switched to the target signal by using the control signal that corresponds to the first electrical characteristic value of the first pin, and the target signal is transmitted by using the pin that is in the peripheral interface and used for signal transmission.

According to the user equipment in this embodiment of the present disclosure, a coded signal sent by an external device is received by using a peripheral interface of the user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be noted that in this embodiment of the present disclosure, a correspondence between a pin that is in the peripheral interface of the user equipment and used for signal transmission and a type of a target signal that a user requests to transmit needs to be preset according to a user need. It needs to be noted that, it should be ensured that when preset, the correspondence does not conflict with a stipulation in an interface protocol of the peripheral interface.

It should be understood that, in this embodiment of the present disclosure, the first electrical characteristic value may include any one of electrical characteristic values such as a first voltage value, a first current value, a first impedance value, a first capacitance value, or a first resistance value to earth, or may include another electrical characteristic value. This is not limited in this embodiment of the present disclosure.

It should be further understood that, in this embodiment of the present disclosure, the peripheral interface of the user equipment 500 may include a USB interface, a network cable interface, a bus interface, and the like.

Optionally, in an embodiment of the present disclosure, the decoding module 520 is configured to determine, according to a correspondence between a control signal and an electrical characteristic value of the first pin, the control signal that corresponds to the first electrical characteristic value of the first pin.

Optionally, in another embodiment of the present disclosure, the first pin in the peripheral interface may be an ID pin, and the first electrical characteristic value of the first pin may be a first resistance value to earth of the ID pin.

It should be understood that, in this embodiment of the present disclosure, another pin in the peripheral interface may be selected as the first pin used to code and decode the control signal that corresponds to the type of the target signal requested by the user. This embodiment of the present disclosure is not limited thereto.

Optionally, in another embodiment of the present disclosure, the pin that is in the peripheral interface and used for signal transmission includes a D+/D− pin, a MicA_SSTX+/MicA_SSTX− pin, a MicA_SSRX+/MicA_SSRX− pin, and a GND_DRAIN pin.

It should be understood that, in this embodiment of the present disclosure, the user equipment 500 according to this embodiment of the present disclosure may correspond to an entity for performing the method 200 according to the embodiment of the present disclosure, and the foregoing and other operations and/or functions of the modules of the user equipment 500 are separately used to implement the corresponding procedures of the methods in FIG. 1 to FIG. 3. For brevity, details are not described herein again.

Figure 7:
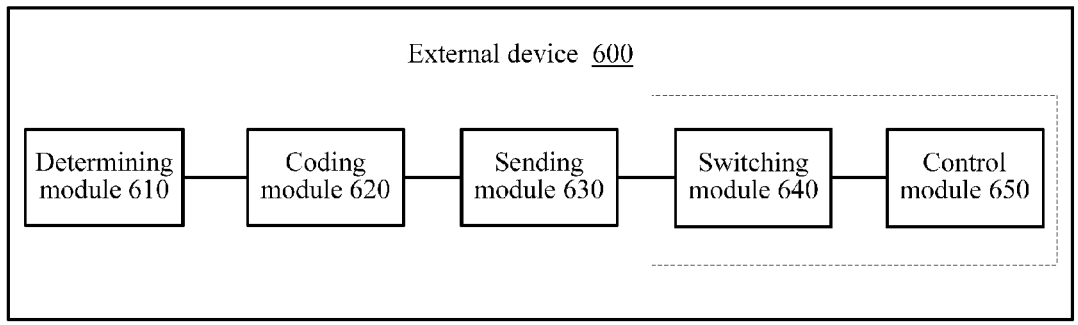
FIG. 7 is a schematic structural diagram of an external device according to an embodiment of the present disclosure.

FIG. 7 is a schematic structural diagram of user equipment 600 according to an embodiment of the present disclosure. The user equipment 600 shown in FIG. 6 includes a determining module 610, a coding module 620, and a sending module 630.

The determining module 610 is configured to determine a first instruction, where the first instruction carries a control signal corresponding to a type of a target signal that a user requests to transmit, and the first instruction is used to instruct the coding module to code the control signal.

The coding module 620 is configured to code the control signal according to the first instruction determined by the determining module 610, to obtain a coded signal, where the coded signal includes a first electrical characteristic value that is of a first pin in a first peripheral interface and that corresponds to the control signal.

The sending module 630 is configured to send, by using the first pin in the first peripheral interface of the external device, the coded signal obtained by the coding module to user equipment UE, so that the UE obtains the control signal according to the coded signal, and controls a pin that is in a peripheral interface of the UE and used for signal transmission to transmit the target signal.

In this embodiment of the present disclosure, the receiving module 610 may receive the first instruction that is entered by the user and carries the control signal corresponding to the type of the target signal that the user requests to transmit. The coding module 620 may code the control signal according to the first instruction to obtain the coded signal. The coded signal includes the first electrical characteristic value that is of the first pin of the first peripheral interface and that corresponds to the control signal. Then, the sending module 630 sends the coded signal to the user equipment UE by using the first pin of the first peripheral interface of the external device 600, so that the UE obtains the control signal according to the coded signal, and controls the pin that is in the peripheral interface of the UE and used for signal transmission to transmit the target signal.

According to the external device in this embodiment of the present disclosure, a coded signal sent by the external device is received by using a peripheral interface of user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be understood that, in this embodiment of the present disclosure, a signal that needs to be transmitted by the user may include one type of signal or may include multiple types of signals. Each of the multiple types of signals may correspond to one control signal, and each control signal may correspond to one coding module, that is, one coding circuit. The external device may receive the first instruction entered by the user, and the control signal is coded according to an indication of the first instruction by a coding module corresponding to the control signal that is carried in the first instruction and corresponds to the type of the target signal. It should be further understood that, in this embodiment of the present disclosure, a correspondence between a target signal that the user requests to transmit and a control signal needs to be preset.

It should be further understood that, in this embodiment of the present disclosure, the first electrical characteristic value may include any one of electrical characteristic values such as a first voltage value, a first current value, a first impedance value, a first capacitance value, or a first resistance value to earth, or may include another electrical characteristic value. This is not limited in this embodiment of the present disclosure.

Optionally, in an embodiment of the present disclosure, the coding module 620 is configured to determine, according to a correspondence between a control signal and an electrical characteristic value of the first pin, the first electrical characteristic value that is of the first pin and that corresponds to the control signal corresponding to the target signal.

Optionally, in another embodiment of the present disclosure, the first pin in the first peripheral interface may be an ID pin, and the first electrical characteristic value of the first pin may be a first resistance value to earth of the ID pin.

It should be understood that, in this embodiment of the present disclosure, another pin in the peripheral interface may be selected as the first pin used to code and decode the control signal that corresponds to the type of the target signal requested by the user. This embodiment of the present disclosure is not limited thereto.

Optionally, in another embodiment of the present disclosure, the external device 600 further includes a switching module 640 configured to switch, according to the control signal, a pin that is in the first peripheral interface of the external device 600 and used for signal transmission, so that the target signal transmitted by using the peripheral interface of the UE is received.

Optionally, in another embodiment of the present disclosure, the external device 600 further includes a control module 650 configured to control a second interface of the external device 600 to transmit the target signal, so that another external device in addition to the external device 600 obtains the target signal, and the second interface is an interface other than the first peripheral interface.

It should be understood that, in this embodiment of the present disclosure, the external device 600 according to this embodiment of the present disclosure may correspond to an entity for performing the method 300 according to the embodiment of the present disclosure, and the foregoing and other operations and/or functions of the modules of the external device 600 are separately used to implement the corresponding procedures of the methods in FIG. 1 to FIG. 3. For brevity, details are not described herein again.

Figure 8:
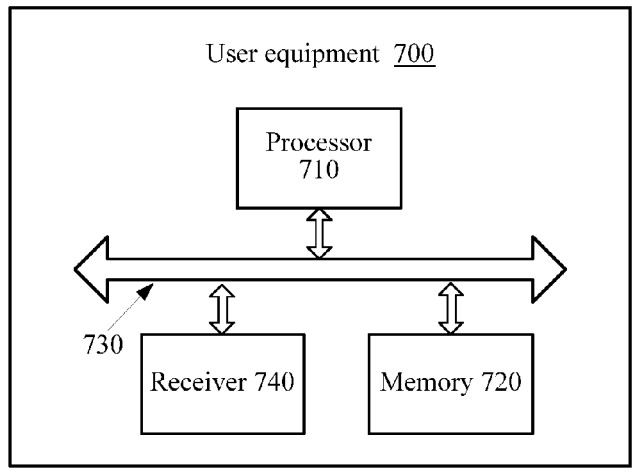
FIG. 8 is a schematic structural diagram of user equipment according to another embodiment of the present disclosure.

An embodiment of the present disclosure further provides user equipment 700. As shown in FIG. 8, the user equipment 700 includes a processor 710, a memory 720, a bus system 730, and a receiver 740. The processor 710, the memory 720, and the receiver 740 are connected to each other by using the bus system 730, the memory 720 is configured to store an instruction, and the processor 710 is configured to execute the instruction stored in the memory 720.

The receiver 740 is configured to receive, by using a first pin in a peripheral interface of the user equipment, a coded signal sent by an external device, where the coded signal includes a first electrical characteristic value of the first pin.

The processor 710 is configured to: decode the coded signal received by the receiver, to obtain a decoded signal, where the decoded signal includes a first control signal that corresponds to the first electrical characteristic value of the first pin, and the first control signal is used to control to switch a signal currently transmitted by the peripheral interface, to the target signal, and to transmit the target signal by using a pin that is in the peripheral interface and used for signal transmission.

According to the user equipment in this embodiment of the present disclosure, a coded signal sent by an external device is received by using a peripheral interface of the user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be understood that in this embodiment of the present disclosure, the processor 710 may be a central processing unit (CPU), or the processor 710 may be another general-purpose processor, digital signal processor (DSP), application-specific integrated circuit (ASIC), or field-programmable gate array (FPGA), or another programmable logic device, discrete gate or transistor logic device, independent hardware component, or the like. The general-purpose processor may be a microprocessor or the processor may be any conventional processor or the like.

The memory 720 may include a read-only memory (ROM) and a random access memory (RAM), and provide an instruction and data to the processor 710. A part of the memory 720 may further include a non-volatile RAM. For example, the memory 720 may further store device type information.

The bus system 730 may include a power bus, a control bus, a status signal bus, and the like in addition to a data bus. However, for clear description, various types of buses in the figure are all marked as the bus system 730.

In an implementation process, the steps of the foregoing method may be completed by using an integrated logical circuit of hardware in the processor 710 or an instruction in a form of software. The steps of the method disclosed with reference to the embodiments of the present disclosure may be directly performed and completed by a hardware processor, or may be performed and completed by using a combination of hardware and software modules in the processor. The software module may be located in a mature storage medium in the art, such as a RAM, a flash memory, a ROM, a programmable ROM, an electrically-erasable programmable memory, or a register. The storage medium is located in the memory 720, and the processor 710 reads information in the memory 720 and completes the steps of the foregoing method in combination with hardware of the processor 710. To avoid repetition, details are not described again herein.

Optionally, in an embodiment of the present disclosure, the processor 710 is configured to determine, according to a correspondence between a control signal and an electrical characteristic value of the first pin, the control signal that corresponds to the first electrical characteristic value of the first pin.

Optionally, in another embodiment of the present disclosure, the first pin in the peripheral interface may be an ID pin, and the first electrical characteristic value of the first pin may be a first resistance value to earth of the ID pin.

Optionally, in another embodiment of the present disclosure, the pin that is in the peripheral interface and used for signal transmission includes a D+/D− pin, a MicA_SSTX+/MicA_SSTX− pin, a MicA_SSRX+/MicA_SSRX− pin, and a GND_DRAIN pin.

It should be understood that the user equipment 700 according to this embodiment of the present disclosure may correspond to an entity for performing the peripheral interface multiplexing method 200 according to the embodiment of the present disclosure, and the user equipment 410 and the user equipment 500 according to the embodiments of the present disclosure. The foregoing and other operations and/or functions of the modules of user equipment 700 are separately used to implement the corresponding procedures of the methods 100 to 300 in FIG. 1 to FIG. 3. For brevity, details are not described herein again.

Figure 9:
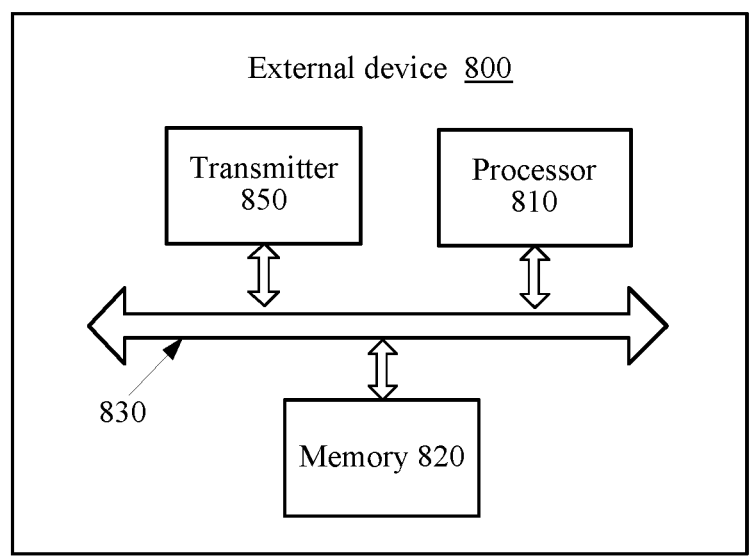
FIG. 9 is a schematic structural diagram of an external device according to another embodiment of the present disclosure.

An embodiment of the present disclosure further provides an external device 800. As shown in FIG. 9, the wireless equipment 800 includes a processor 810, a memory 820, a bus system 830, a receiver 840, and a transmitter 850. The processor 810, the memory 820, the receiver 840, and the transmitter 850 are connected to each other by using the bus system 830, the memory 820 is configured to store an instruction, and the processor 810 is configured to execute the instruction stored in the memory 820.

The processor 810 is used to: determine a first instruction, where the first instruction carries a control signal corresponding to a type of a target signal that a user requests to transmit, and the first instruction is used to instruct a coding module to code the control signal; switch, according to the first instruction received by the receiving module, a current coding module to a coding module corresponding to the first control signal; and code the first control signal to obtain a coded signal, where the coded signal includes a first electrical characteristic value that is of a first pin in a first peripheral interface and that corresponds to the first control signal.

The transmitter 850 is configured to send, by using the first pin in the first peripheral interface of the external device, the coded signal obtained by the coding module to user equipment UE, so that the UE obtains the control signal according to the coded signal, and controls a pin that is in a peripheral interface of the UE and used for signal transmission to transmit the target signal.

According to the external device in this embodiment of the present disclosure, a coded signal sent by the external device is received by using a peripheral interface of user equipment, and the coded signal is decoded to obtain a control signal corresponding to a type of a target signal that a user requests to transmit. The control signal controls a pin that is in the peripheral interface and used for signal transmission to transmit the target signal. Therefore, communications interfaces of user equipment can be extended without increasing a quantity of peripheral interfaces, so that the user equipment provides more communications manners, and user experience is improved.

It should be understood that in this embodiment of the present disclosure, the processor 810 may be a CPU, or the processor 810 may be another general-purpose processor, DSP, ASIC, or FPGA, or another programmable logic device, discrete gate or transistor logic device, independent hardware component, or the like. The general-purpose processor may be a microprocessor or the processor may be any conventional processor or the like.

The memory 820 may include a ROM and a RAM, and provide an instruction and data to the processor 810. A part of the memory 820 may further include a non-volatile RAM. For example, the memory 820 may further store device type information.

The bus system 830 may include a power bus, a control bus, a status signal bus, and the like in addition to a data bus. However, for clear description, various types of buses in the figure are all marked as the bus system 830.

In an implementation process, the steps of the foregoing method may be completed by an integrated logical circuit of hardware in the processor 810 or an instruction in a form of software. The steps of the method disclosed with reference to the embodiments of the present disclosure may be directly performed and completed by a hardware processor, or may be performed and completed by using a combination of hardware and software modules in the processor. The software module may be located in a mature storage medium in the art, such as a RAM, a flash memory, a ROM, a programmable ROM, an electrically-erasable programmable memory, or a register. The storage medium is located in the memory 820, and the processor 810 reads information in the memory 820 and completes the steps of the foregoing method in combination with hardware of the processor 810. To avoid repetition, details are not described again herein.

Optionally, in an embodiment of the present disclosure, the processor 810 is configured to determine, according to a correspondence between a control signal and an electrical characteristic value of the first pin, the first electrical characteristic value that is of the first pin and that corresponds to the control signal.

Optionally, in another embodiment of the present disclosure, the first pin in the first peripheral interface may be an ID pin, and the first electrical characteristic value of the first pin may be a first resistance value to earth of the ID pin.

Optionally, in another embodiment of the present disclosure, the processor 810 is further configured to switch, according to control information, a pin that is in the first peripheral interface of the external device and used for signal transmission, so that the target signal transmitted by using the peripheral interface of the UE is received.

Optionally, in another embodiment of the present disclosure, the processor 810 is further configured to control a second interface of the external device to transmit the target signal, so that another external device in addition to the external device obtains the target signal, and the second interface is an interface other than the first peripheral interface.

It should be understood that, in this embodiment of the present disclosure, the external device 800 according to this embodiment of the present disclosure may correspond to an entity for performing the method 300 according to the embodiment of the present disclosure, and the external device 450 and the external device 600 according to the embodiments of the present disclosure. The foregoing and other operations and/or functions of the modules of the external device 800 are separately used to implement the corresponding procedures of the methods in FIG. 1 to FIG. 3. For brevity, details are not described herein again.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the unit division is merely logical function division and may be other division in implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to some approaches, or all or a part of the technical solutions may be implemented in the form of a software product. The software product is stored in a storage medium and includes several instructions for instructing a computer device (which may be a PC, a server, or a network device) to perform all or a part of the steps of the methods described in the embodiments of the present disclosure. The foregoing storage medium includes any medium that can store program code, such as a USB flash drive, a removable hard disk, a ROM, a RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A peripheral interface multiplexing method comprising:
receiving, by a user equipment (UE), a coded signal from an external device, wherein the coded signal comprises a first electrical characteristic value of a first pin in a peripheral interface of the UE;
decoding the coded signal to obtain a decoded signal, wherein the decoded signal comprises a control signal corresponding to the first electrical characteristic value of the first pin, wherein the control signal is used to control the peripheral interface to transmit a target signal; and
controlling, based on the control signal, a transmit pin that is in the peripheral interface and used for signal transmission to transmit the target signal.

2. The method of claim 1, wherein the decoding the coded signal comprises determining the control signal based on a correspondence between the control signal and the first electrical characteristic value of the first pin.

3. The method of claim 1, wherein the first electrical characteristic value comprises at least one of: a first voltage value, a first current value, a first impedance value, a first capacitance value, or a first resistance value to earth.

4. The method of claim 2, wherein the first electrical characteristic value comprises at least one of: a first voltage value, a first current value, a first impedance value, a first capacitance value, or a first resistance value to earth.

5. The method of claim 1, wherein the first pin in the peripheral interface is an ID pin, and wherein the first electrical characteristic value of the first pin is a first resistance value to earth of the ID pin.

6. The method of claim 2, wherein the first pin in the peripheral interface is an ID pin, and wherein the first electrical characteristic value of the first pin is a first resistance value to earth of the ID pin.

7. The method of claim 5, wherein the transmit pin comprises at least one of: a D+/D−pin, a MicA_SSTX+/MicA_SSTX−pin, a MicA_SSRX+/MicA_SSRX−pin, and a GND_DRAIN pin.

8. A user equipment (UE) comprising:
a memory comprising instructions; and
a processor coupled to the memory to execute the instructions to cause the UE to:

receive a coded signal from an external device, wherein the coded signal comprises a first electrical characteristic value of a first pin in a peripheral interface of the UE;

decode the coded signal to obtain a decoded signal, wherein the decoded signal comprises a control signal corresponding to the first electrical characteristic value of the first pin, wherein the control signal is used to control the peripheral interface to transmit a target signal; and control, based on the control signal, a transmit pin that is in the peripheral interface and used for signal transmission to transmit the target signal.

9. The UE of claim 8, wherein the instruction that cause the UE to decode the coded signal comprise instructions that cause the UE to determine the control signal based on a correspondence between the control signal and the first electrical characteristic value of the first pin.

10. The UE of claim 8, wherein the first electrical characteristic value comprises at least one of: a first voltage value, a first current value, a first impedance value, a first capacitance value, or a first resistance value to earth.

11. The UE of claim 9, wherein the first electrical characteristic value comprises at least one of: a first voltage value, a first current value, a first impedance value, a first capacitance value, or a first resistance value to earth.

12. The UE of claim 8, wherein the first pin in the peripheral interface is an ID pin, and wherein the first electrical characteristic value of the first pin is a first resistance value to earth of the ID pin.

13. The UE of claim 9, wherein the first pin in the peripheral interface is an ID pin, and wherein the first electrical characteristic value of the first pin is a first resistance value to earth of the ID pin.

14. The UE of claim 12, wherein the transmit pin comprises at least one of: a D+/D−pin, a MicA_SSTX+/MicA_SSTX−pin, a MicA_SSRX+/MicA_SSRX−pin, and a $GND_{13}$ DRAIN pin.

15. A computer program product comprising a non-transitory computer-readable medium storing computer executable instructions which when executed cause one or more processors to:

receive a coded signal from an external device, wherein the coded signal comprises a first electrical characteristic value of a first pin in a peripheral interface of the user equipment (UE);

decode the coded signal to obtain a decoded signal, wherein the decoded signal comprises a control signal corresponding to the first electrical characteristic value of the first pin, wherein the control signal is used to control the peripheral interface to transmit a target signal; and control, based on the control signal, a transmit pin that is in the peripheral interface and used for signal transmission to transmit the target signal.

* * * * *

UNITED STATES PATENT AND TRADEMARK OFFICE
CERTIFICATE OF CORRECTION

PATENT NO. : 10,331,580 B2  
APPLICATION NO. : 15/557634  
DATED : June 25, 2019  
INVENTOR(S) : Jun Yang and Yuhua Guo Page 1 of 1

It is certified that error appears in the above-identified patent and that said Letters Patent is hereby corrected as shown below:

In the Claims

Claim 15, Column 24, Line 10: "$GND_{13}DRAIN$ pin" should read "GND_DRAIN pin"

Signed and Sealed this  
Twenty-seventh Day of August, 2019

Andrei Iancu  
*Director of the United States Patent and Trademark Office*